March 29, 1927.

L. McCARTHY 1,622,795

APPARATUS FOR FORMING COMPOSITE MICA SHEETS

Filed Nov. 6, 1922

INVENTOR:
Louis McCarthy,
by Macleod, Calvert, Copeland & Dike,
Attys.

March 29, 1927. 1,622,795
L. McCARTHY
APPARATUS FOR FORMING COMPOSITE MICA SHEETS
Filed Nov. 6, 1922 2 Sheets-Sheet 2

INVENTOR:
Louis McCarthy
by Macleod, Calvert, Copeland & Dike
Attys.

Patented Mar. 29, 1927.

1,622,795

UNITED STATES PATENT OFFICE.

LOUIS McCARTHY, OF BOSTON, MASSACHUSETTS, ASSIGNOR TO THE MACALLEN COMPANY, OF BOSTON, MASSACHUSETTS, A CORPORATION OF MASSACHUSETTS.

APPARATUS FOR FORMING COMPOSITE MICA SHEETS.

Application filed November 6, 1922. Serial No. 599,248.

This invention relates to the manufacture of composite sheets from flaky or plate-like material, and especially, although not exclusively, to the production of the mica sheets used in the manufacture of insulators, as, for example, insulating bushings, thimbles, etc. In making these and other articles from mica, as also in the use of mica for some other purposes, it is necessary to employ sheets of material of greater area, thickness, cohesion and pliability than can be found in nature. The natural laminæ of mica are of limited size, and the masses thereof, of whatever thickness, tend to separate along their lines of cleavage into their constituent plates, flakes or laminæ, so that a sheet of mica, even if it can be obtained in its natural form of a sufficient area and thickness, which is unusual, is not sufficiently pliable, and has not sufficient cohesion along its lines of cleavage, to enable the same to be shaped or molded in the desired manner.

It has, therefore, been customary to build up composite sheets of considerable size from the natural plates or flakes of mica by cementing them together with a suitable binder in liquid form, as for example, shellac. Such sheets can be rendered pliable by heat, which softens the shellac, and can be cut, die shaped, or otherwise worked into the desired articles. These composite sheets have, for the most part, been made by hand, usually by girls who use a suitable frame or tray having a bottom of wire gauze upon which the plates or flakes of mica are laid in successive layers with the interposition, from time to time, of a suitable amount of shellac binder, manually applied to the flakes, this operation being continued until a sheet of the desired thickness has been built up, the frame being held before or over a suitable light for the assistance of the girl in keeping the sheet of an approximately even thickness. This operation is slow and laborious, the quantity of the product depending largely upon the care and skill of the individual operators, and it being practically impossible to form a sheet having straight, square edges of the same even thickness and cohesion as the remainder of the sheet. This is due to the fact that the binder is applied by hand to the plates after they are laid in the tray, and this binder is not thoroughly worked into the interstices between the plates at the edge and corners of the tray, so that the resultant sheets are characterized by a lack of adequate adhesion between the constituent plates at these points.

With a view to decreasing the time and labor involved in the manufacture of these sheets, it has been proposed to shower the plates or flakes upon the trays, attempting in this way to spread them evenly, until they have been deposited thereon to a sufficient depth, and thereafter to attempt to force the binder into the spaces between them under pressure or by means of a vacuum or otherwise. Such attempts have not been altogether successful, inasmuch as it is difficult in this way to cause the binder to penetrate the sheet to a sufficient extent to give the sheet its necessary tenacity throughout, the sheets so formed being also so limited in size that the saving in time and labor is small.

I have found that by showering the plates or flakes from a considerable height, preferably from a foraminous container, such as a rotating drum, upon a suitable extended surface, spreading the liquid binder upon the plates during the showering operation, or between successive layers of the deposited plates, and rolling the whole, said binder will be caused to penetrate the interstices between the superimposed and interlocked plates or flakes, and a sheet of substantially constant thickness and of great tenacity will be produced. Also, by relatively moving the surface and the drum or other container from which the plates or flakes are showered, it will be seen that a sheet of an area limited only by the area of said surface and the amount of relative movement may be made. Such a sheet may be produced at a very small fraction of the cost and in a very small fraction of the time necessary to produce an equal quantity by any of the methods above referred to and is of considerably better quality than any material which can be produced by such methods. The present invention has for its general object to provide a machine for forming sheets in this improved manner.

The more particular objects of the invention, together with means whereby the same may be carried into effect, will be best understood from the following description of one form or embodiment thereof shown in the accompanying drawings. Since, however, I believe myself to be the first to form composite sheets of mica or similar material by showering the constitutent plates or flakes from an elevated source upon a receiving surface while relatively moving said source and surface or while simultaneously supplying a liquid binder, I wish to claim my invention broadly and to have it understood that the particular apparatus shown and described has been chosen for illustrative purposes merely, and that the invention, as defined by the claims hereunto appended, may be otherwise practised without departure from its spirit and scope.

Figure 1:
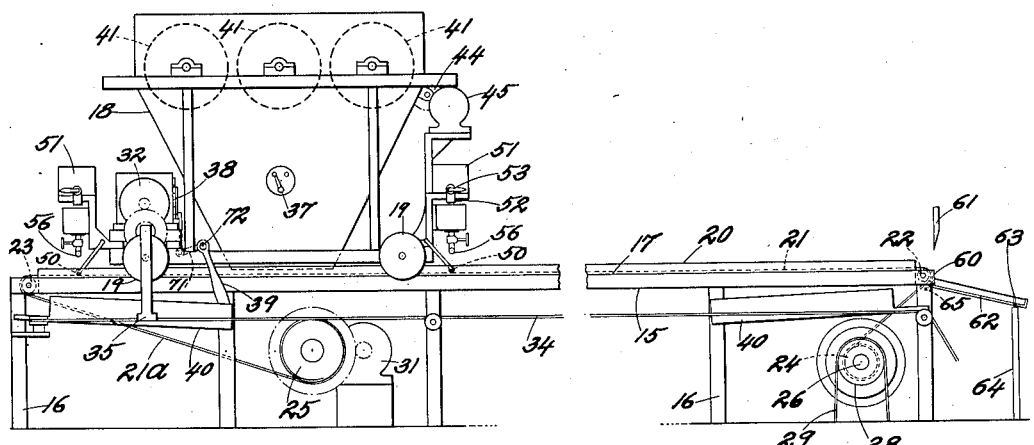
Fig. 1 is a somewhat diagrammatic side elevation, partly broken out, of a machine constructed and operated in accordance with my invention.

The machine as a whole comprises an elongated bed 15 mounted on suitable supports 16 and at the opposite sides of which, and extending longitudinally thereof, are rails 17 constituting a track upon which is mounted to travel a carriage 18 having at opposite sides wheels 19 to run on said track, and carrying in elevated position means for showering mica or similar plates or flakes upon the bed 15, the arrangement being such that said carriage extends across the bed for the entire width of the latter and moves longitudinally over the same as the wheels 19 run upon the track 17.

Figure 3:
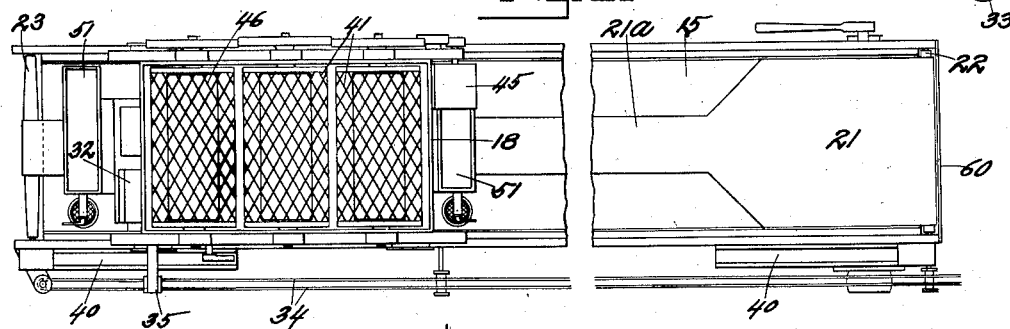
Fig. 3 is a view similar to Figure 2 showing certain of the parts in slightly different positions.
Figure 5:
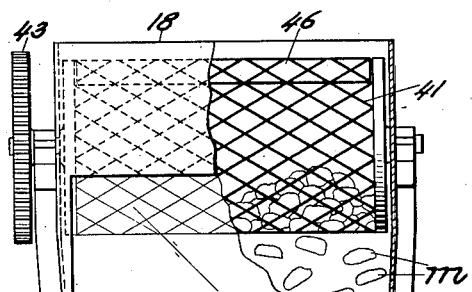
Fig. 5 is an end elevation, partly broken away, looking from the left in Figure 4.
Figure 6:
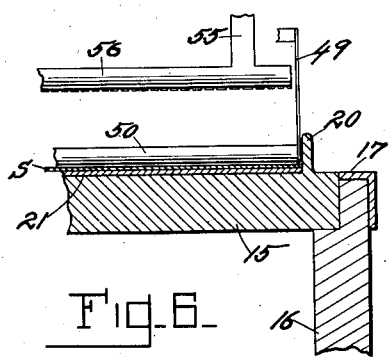
Fig. 6 is a detail transverse section, on a further enlarged scale, of a portion of one edge of the bed and certain of the parts cooperating therewith.

The bed 15 is preferably composed of slate or the like, in order to reduce to a minimum the effect of expansion and contraction, and is formed along its opposite longitudinal edges with parallel vertical ribs 20 (see particularly Figure 6) for a purpose hereinafter explained. Extending longitudinally over the upper surface of the bed 15, and of a width substantially equal to the distance between the ribs 20, is a belt or apron 21 of canvas or other suitable fabric, said belt passing over transverse rollers 22 and 23 at the opposite ends of the bed, and having its ends secured to and wound upon drums 24 and 25 suitably journalled beneath the bed. The belt 21 affords a flexible surface upon which the mica, indicated at $m$ in Figure 5, is showered. The drum 24 is carried by a shaft 26 and may be operatively connected, through a clutch 27 operated by a handle 30, with a belt pulley 28 adapted to receive power from any suitable source through a belt 29. The particular clutch mechanism for operatively connecting the drum 24 with the belt pulley 28 forms no portion of the invention and may be of any desired character. As herein shown it is of the well known type usually employed for controlling the drums of donkey hoists. The drum 25 is geared to an electric motor 31 controlled by a switch (not shown) located at any convenient point. The end 21ª (Figure 3) of the belt 21, which is connected with the drum 25, is of reduced width, as shown in Figure 3, in order to reduce the tendency of said belt to stick to the bed 15 when moved longitudinally thereover, while the roller 23 at that end of the bed is somewhat crowned, thereby drawing the belt taut at its longitudinal center and causing the same to lie flat upon the bed 15.

Figure 4:
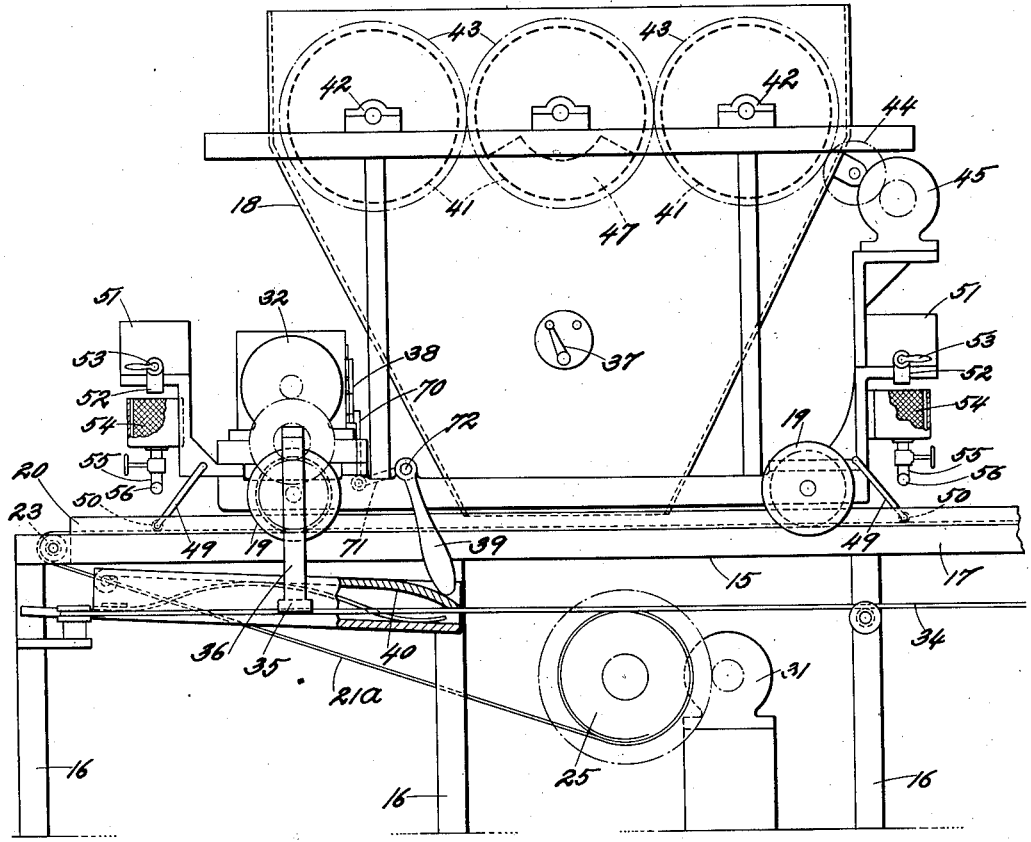
Fig. 4 is an enlarged side elevation of the portion of the machine shown at the left in Fig. 1.

The carriage 18 is propelled along the track 17 and over the bed 15 by means of an electric motor 32 which receives its power from a generator or other source 33 (Figure 2) through conductors 34 extending parallel to the track and engaged by a shoe 35 carried by an arm 36 on said carriage. The electric circuits and connections between the contact faces on the shoe 35 and the motor 32 are not shown in detail herein, as they may be of any well known character, said connections, however, including a main switch or controller 37 (Figure 1) on the side of the carriage, and a reversing switch 38 (Figure 5) associated with the motor 32. The reversing switch 38 is operated to reverse the direction of travel of the carriage by means of a link 70 (Figures 4 and 5) connected with an arm 71 on a rock shaft 72 journalled in the carriage and having a handle 39 cooperating with pivoted, spring pressed stops or trip devices 40 located at opposite ends of the machine, whereby the travel of said carriage is automatically reversed when said carriage reaches either end of the bed 15.

The body of the carriage 18 is in the form of a hopper carrying at its upper end one or more rotatable, foraminous drums 41. As herein shown, three drums 41 are employed, said drums being mounted in bearings 42 in the upper parts of the side walls of the carriage 18 and being connected by gears 43 with each other and by a gear 44 with another electric motor 45 on the carriage, the motor 45 being connected in multiple with the motor 32 between the main switch 37 and the reversing switch 38, so that the rotation of the motor 45 will be continuous in one direction irrespective of the reversal of the motor 32, it having been found that better results are obtained by rotating the drums 41 constantly in the same direction irrespective of the direction of travel of the carriage 18. The drums 41 are preferably composed of woven wire fabric of relatively large mesh determined, as herein after explained, by the size of the material used, each of said drums having in its periphery a movable section or cover 46 providing a filling opening, and one of said drums being preferably provided with an eccentric weight 47 so arranged that when the motor 45 is stopped said drums will be brought to rest with their covers 46 at the top for convenience in filling through the top of the hopper. Said hopper is preferably formed with one or more suitably located windows 48 through which the showering of material from the drums may be observed. The walls of the hopper enclose the space through which the plates or flakes of mica m fall upon the bed and therefore shield the falling plates or flakes from atmospheric disturbance caused by drafts in the workroom. This is of importance in securing an even spreading of the material on the bed.

At each end of the carriage 18, and supported by arms 49, is a roller 50 adapted to cooperate with the bed 15 and the belt 21 thereon, as the carriage moves thereover, to roll down the material on said belt. As shown most clearly in Figure 6, the arms 49 are made as thin as practicable, so that the rollers 50 are substantially equal in width to the space between the ribs 20. Also carried at either end of the carriage 18 is a tank or reservoir 51 for a suitable binder in liquid form, as for example an alcohol solution of shellac. Each of the tanks 51 communicates through a nozzle 52 controlled by a manually operated valve 53 with a strainer or filter 54, the latter in turn communicating through a pipe or pipes 55 with a perforated sprinkler pipe 56 extending transversely of the carriage immediately over the corresponding roller 50 so as to discharge thereupon. By providing rollers 50 and tanks 51 at both ends of the carriage, the plates or flakes on the bed are supplied with a binder and are rolled down clear to the ends of the bed irrespective of the length of the carriage. The ribs 20 and rollers 50 cooperate to produce composite sheets of constant thickness and tenacity throughout and with straight, square, abrupt, and parallel edges. The material is showered and the binder spread over the full width of the bed between the ribs, and the compressive action of the rollers tends to force the binder into the angles between the ribs and the surface of the bed, thereby resulting in fully as great an adhesion between the constituent plates at the edge of the sheet as in any part thereof. Any portions of the plates or flakes which may fall against and tend to project beyond the ribs are bent upwardly and broken off thereagainst by the ends of the rollers, thereby producing straight edges on the sheet.

At the end of the bed 15 adjacent the roller 22 is located a pair of shears of any standard and suitable type comprising fixed and movable knives 60 and 61. Spaced from said end of the machine are suitable supports 64 upon which, and another suitable support in the form of a ledge 65 adjacent the fixed knife 60 of the shears, may be placed trays 62 to receive the finished product. Said trays are preferably formed with foraminous bottoms composed, for example, of woven wire fabric, to facilitate the drying of the composite sheets. The supports 64 preferably carry at their upper edges positioning pins 63 which extend through the fabric of the bottoms of the trays 62 for a purpose hereinafter explained.

Figure 2:
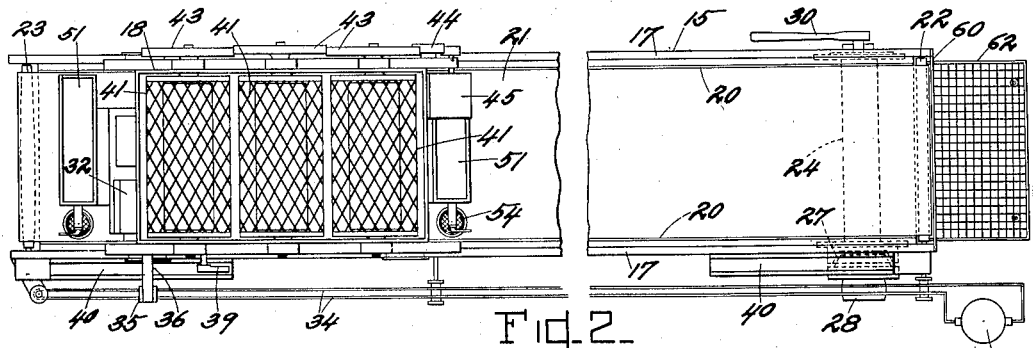
Fig. 2 is a plan view of the parts shown in Figure 1.

In the operation of the machine, the mica or other plates or flakes are preferably first graded according to size, as for example by being passed through a suitable series of screens, and a supply of plates or flakes of approximately equal size placed in the drums 41 through the doors 46 therein, the mesh of the fabric forming said drums being preferably chosen in accordance with the size or grade of material to be used therein. The motor 31 and drum 25 are operated to draw the belt 21 substantially as far as possible toward the left, as shown in Figure 2, and the main switch 37 is then operated to start the motors 32 and 45. The carriage 18 will thereupon travel longitudinally of the bed and the rotating drums 41 will shower the plates or flakes upon said bed, substantially covering the same, said flakes or plates being rolled down by the rollers 50 as the carriage passes thereover. The direction of travel of the carriage is automatically reversed, as above explained, from time to time, as each longitudinal traverse of the bed is completed, thereby evenly depositing the plates or flakes in successive layers, the plates or flakes of the same and adjacent layers so falling as to automatically interlock with one another at their edges. During the longitudinal traverse of the carriage over the bed, in accordance with the judgment of the operator, the valves 53 are opened, causing the liquid binder to be sprinkled upon the corresponding rollers 50 and by them applied to and evenly spread upon the flakes or plates, said rollers at the same time rolling and compressing the whole. Said binder penetrates the interstices between the several plates or flakes so as to unite the same into a solid sheet which is compacted and made of even thickness by the pressure of the rollers 50, said pressure also assisting in forcing the binder throughout the material. Where three drums 41 are employed, as in the construction shown, one or the other of the valves 53 will usually be left open to a greater or less extent throughout the operation, with the exception of the first traverse of the carriage which lays the first layer of plates or flakes upon the belt. In some cases, however, as when a fewer number of drums 41 is used, or if a sprinkler of greater capacity be employed, it may be found sufficient to leave the valve or valves open through only one out of two or three longitudinal trips of the carriage. At all events, one or the other of the valves is opened to an extent sufficient to cause the spaces between the flakes to be fully permeated by the binder, the manner in which the valves are operated causing the sheet produced to tend, to a greater or less extent, toward lamination, as is the case with natural mica, although producing a structure of considerable greater cohesion between the several laminæ, and one which is of a more pliable character. The operations above described are successively repeated by successive trips of the carriage 18 until the sheet S (Figure 6) built up upon the belt 21, is of the desired thickness, whereupon the switch 37 is operated to stop the carriage, preferably when the latter is at the end of the bed opposite the shears, as shown in Figure 1. The clutch 27 is then operated by the handle 30 to cause the drum 24 to draw the belt 21 over the roller 22, this abrupt bending of the belt causing the sheet S to leave the same and to be fed over the fixed knife 60 and upon the tray 62 until its forward end or edge is brought into contact with the stop pins 63. The clutch 27 is then released and the knife 61 operated to cut off a section of the sheet, the tray 62 removed, another one put in its place, and the operations repeated until the entire sheet S has been cut up into sections of convenient size. The belt 21 being then in substantially the position shown in Figure 3, the drum 25 is then again operated by the motor 31 to rewind said belt, and the mechanism is in condition to commence the formation of another sheet.

It is found in practice that, by the use of machines such as above described, two or three men can, in a given time, produce as great a quantity of composite sheets as can two hundred or more operators by the old hand method, and that the sheet so produced is of a more even and better quality than the material produced by said former method.

The method referred to in connection with the operation of the machine above described is not claimed herein, being covered by the claims of another application filed November 6, 1922, Serial No. 599,249.

Having thus described my invention, I claim—

1. A machine of the character described comprising, in combination, a bed, means for showering plates or flakes of mica or the like by gravity upon said bed, means for relatively moving said bed and showering means, means for applying a binder in liquid form to the plates or flakes upon the said bed, and means for rolling said plates or flakes and binder upon said bed.

2. A machine of the character described comprising, in combination, a bed, means for showering plates or flakes of mica or the like by gravity upon said bed, means for relatively and repeatedly traversing said bed and showering means to deposit said plates or flakes in successive layers upon said bed, means for applying a binder to the several layers, and means for rolling each layer with the binder applied thereto prior to the deposit of the succeeding layer.

3. A machine of the character described comprising, in combination, a bed, a track extending longitudinally of said bed, a carriage movable on said track over said bed, a conductor extending parallel with said track, an electric motor on said carriage for propelling the same, a shoe on said carriage and engaging said conductor for supplying said motor with current, and means supported in an elevated position on said carriage for showering plates or flakes of mica or the like upon said bed.

4. A machine of the character described comprising, in combination, a bed, a track, a carriage movable on said track over said bed, and a plurality of intergeared rotating drums supported in an elevated position on said carriage.

5. A machine of the character described comprising, in combination, a bed, a track, a carriage movable on said track over said bed, means on said carriage for showering plates or flakes of mica or the like upon said bed, and means on said carriage for applying a binder in liquid form to the plates or flakes on said bed.

6. A machine of the character described comprising, in combination, a bed, a track, a carriage movable on said track over said bed, means on said carriage for showering plates or flakes of mica or the like upon said bed, means on said carriage for applying a binder in liquid form to the plates or flakes on said bed, and means for automatically reversing the direction of movement of said carriage when it reaches the end of said bed.

7. A machine of the character described comprising, in combination, a bed, a track, a carriage movable on said track over said bed, means comprising a foraminous distributing device supported in an elevated position on said carriage for showering plates or flakes of mica on said bed as said carriage moves thereover, a receptacle for liquid binder on said carriage, and a sprinkler on said carriage communicating with said receptacle.

8. A machine of the character described comprising, in combination, a bed, a track, a carriage movable on said track over said bed, means on said carriage for showering plates or flakes of mica or the like upon said bed, and a roller on said carriage for rolling said plates or flakes upon said bed.

9. A machine of the character described comprising, in combination, a bed, a track, a carriage movable on said track over said bed, means on said carriage for showering plates or flakes of mica or the like upon said bed, a roller on said carriage for rolling said plates or flakes upon said bed, and means for automatically reversing the direction of movement of said carriage when it reaches the end of said bed.

10. A machine of the character described comprising, in combination, a bed, a track, a carriage movable on said track over said bed, means on said carriage for showering plates or flakes of mica or the like upon said bed, means on said carriage for applying a binder in liquid form to said flakes or plates, and a roller on said carriage for rolling said plates or flakes with said binder upon said bed.

11. A machine of the character described, comprising in combination, a bed, a track, a carriage movable on said track over said bed, a foraminous distributing device supported in an elevated position on said carriage, means on said carriage for feeding a binder in liquid form, and a roller on said carriage cooperating with said bed.

12. A machine of the character described comprising, in combination, a bed, a track, a carriage movable on said track over said bed, means on said carriage for showering plates or flakes of mica or the like upon said bed, a roller on said cariage for rolling said plates or flakes upon said bed, and means for sprinkling a binder in liquid form upon said roller.

13. A machine of the character described comprising, in combination, a bed, a track, a carriage movable on said track over said bed, a motor on said carriage for propelling the same along said track, a rotating foraminous drum supported in elevated position on said carriage, and a separate motor for rotating said drum.

14. A machine of the character described comprising, in combination, a bed, a track extending along said bed, a carriage movable on said track over said bed, a motor for propelling said carriage, means for automatically reversing said motor when said carriage reaches the end of said bed, a foraminous drum supported in elevated position on said carriage, and a separate motor for rotating said drum continously in the same direction irrespective of the direction of travel of said carriage.

15. A machine of the character described comprising in combination, a bed, a track extending along said bed, a carriage movable on said track over said bed, means on said carriage for showering plates or flakes of mica or the like upon said bed, means at both sides of said carriage for showering a liquid binder upon said bed, and rollers at each end of said carriage, said rollers cooperating with said bed.

16. A machine of the character described comprising, in combination, a bed having parallel, longitudanally-disposed, raised edges, means movable over said bed for showering plates or flakes of mica or the like upon the same, and a roller extending transversely of said bed and movable longitudinally thereof, said roller being substantially equal in length to the width of said bed between said raised edges.

17. A machine of the character described comprising, in combination, a bed, a belt extending longitudinally of said bed, drums upon which the ends of said belt are rolled, one end of said belt being of reduced width, and means for showering plates or flakes of mica or the like upon the said belt.

18. A machine of the character described comprising, in combination, a bed, a belt extending longitudinally of said bed, means for showering plates or flakes of mica or the like upon said belt, and a crowned roller at the end of said bed over which said belt passes.

19. A machine of the character described comprising, in combination, a bed, a belt extending longitudinally of said bed, means for showering plates or flakes of mica or the like upon said belt, drums to which the ends of said belt are secured and upon which they are wound, one end of said belt being of reduced width, and a crowned roller at the end of said bed over which said belt runs.

20. A machine of the character described comprising, in combination, a bed, a track extending longitudinally of said bed, a carriage movable on said track over said bed, a belt on said bed and extending longitudinally thereof, and means on said carriage for showering plates or flakes of mica or the like upon said belt.

21. A machine of the character described comprising, in combination, a bed, a track extending longitudinally of said bed, a carriage movable on said track over said bed, a motor for propelling said carriage, a belt on said bed extending longitudinally thereof, a foraminous drum on said carriage for showering plates or flakes of mica or the like upon said belt, a second motor for rotating said drum, means on said carriage for applying a liquid binder to said plates or flakes to cement them together in a continuous composite sheet, means for moving said belt longitudinally to discharge said sheet, and a third motor for returning said belt to normal position.

22. A machine of the character described comprising, in combination, a bed, a belt on said bed and extending longitudinally thereof, a roller at the end of said bed over which said belt passes, means for showering plates or flakes of mica or the like upon said belt, means for applying a liquid binder to said plates or flakes to cement them together into a continuous sheet upon said belt, means for moving said belt longitudinally to disengage said sheet therefrom as it passes over said roller, and a cutter for cutting said sheet into sections as it is discharged from said belt.

23. A machine of the character described comprising in combination, a bed, a belt extending longitudinally over said bed, means for showering plates or flakes of mica or the like upon said bed, means for applying a binder to said plates or flakes to cement them together into a continuous sheet upon said belt, means for moving said belt longitudinally in one direction to discharge said sheet, a cutter for cutting said sheet into sections as it is discharged, and means for returning said belt to normal position.

24. In a machine of the character described, in combination, a bed, a plurality of intergeared foraminous drums rotatably supported in an elevated position above said bed, and means for rotating said drums, said drums having filling openings and covers for closing the same, and being weighted so as to cause them to tend normally to occupy positions with said filling openings uppermost.

25. A machine of the character described comprising, in combination, a bed, a belt on said bed and extending longitudinally thereof, a roller at the end of said bed over which said belt passes, a carriage movable over said bed, means for said carriage for showering plates or flakes of mica or the like upon said belt, means on said carriage for spreading a binder in liquid form upon said plates or flakes to cement them together into a composite sheet, and means for drawing said belt over said roller to release said sheet therefrom and discharge the same.

In testimony whereof I affix my signature.

LOUIS McCARTHY.